United States Patent [19]

Kreuger et al.

[11] 4,106,961

[45] Aug. 15, 1978

[54] METHOD OF MANUFACTURING A LONGITUDINALLY WATERTIGHT TELECOMMUNICATION CABLE

[75] Inventors: Frederik Hendrik Kreuger, Delft; Jacobus Petrus Ignatius Van Kesteren, Leidschendam, both of Netherlands

[73] Assignee: N.K.F. Kabel B.V., Netherlands

[21] Appl. No.: 719,925

[22] Filed: Sep. 2, 1976

Related U.S. Application Data

[63] Continuation of Ser. No. 585,959, Jun. 11, 1975, abandoned.

[30] Foreign Application Priority Data

Jun. 28, 1974 [NL] Netherlands ................ 7408740

[51] Int. Cl.² .................................... H01B 13/00
[52] U.S. Cl. ................................... 156/48; 156/55; 174/23 C; 174/110 S; 174/116; 427/118
[58] Field of Search ................. 156/48, 51–52, 156/53, 55; 174/23 R, 23 C, 120 AR, 110 AR, 110 SR, 110 S, 116, 120 R, 120 SR; 264/174

[56] References Cited

U.S. PATENT DOCUMENTS

| | | | |
|---|---|---|---|
| 3,340,112 | 9/1967 | Davis et al. | 156/48 X |
| 3,566,009 | 2/1971 | Lamond et al. | 174/116 |
| 3,758,441 | 9/1973 | Nitsche et al. | 427/118 X |
| 3,767,454 | 10/1973 | Franke et al. | 174/23 R UX |

FOREIGN PATENT DOCUMENTS 1,387,095  3/1975  United Kingdom ............ 174/23R

OTHER PUBLICATIONS

"Silicone Protectors for Electrical Power Systems", Dow Corning, Jun. 22, 1970.

*Primary Examiner*—David A. Simmons
*Attorney, Agent, or Firm*—Frank R. Trifari; David R. Treacy

[57] ABSTRACT

A method of rendering a cable having a core consisting of a plurality of conductors longitudinally watertight. A silicone rubber which vulcanizes upon exposure to moisture is used between the conductors either throughout the entire length or in blocks.

2 Claims, No Drawings

METHOD OF MANUFACTURING A LONGITUDINALLY WATERTIGHT TELECOMMUNICATION CABLE

This is a continuation, of application Ser. No. 585,959, filed June 11, 1975, now abandoned.

BACKGROUND OF THE INVENTION

1. Field of the Invention

This invention relates to a method of manufacturing a longitudinally watertight telecommunication cable having a core comprising a plurality of conductors each covered with a synthetic insulating material, the interstices between the conductors and the space between the core and the sheath being filled with a compound which prevents water from penetrating into the cable core in the direction of the length of the cable.

Cables of this type are known. In cables laid in the ground water may penetrate into the cable core through defects of the sheath due to mechanical damage. Such defects may be due to subsidence of the ground or to mechanical force. In the core of a cable composed of conductors or bundles of conductors which are twisted together, as generally is the case in telecommunication cables, water which has made its way into the cable may spread in the direction of the length thereof through the interstices between the conductors and the space between the core and the sheath. When the conductors are individually insulated with a synthetic resin, the presence of water becomes manifest only after the water has penetrated over a comparatively large distance, so that the electric properties of the cable deteriorate, which deterioration can be corrected only with great difficulty. Penetration of water can be prevented if highly viscous compounds or a foamed synthetic resin is applied throughout the length of the cable or in blocks, i.e. in longitudinally separated regions spaced at regular intervals in the direction of the length of the cable over a given distance.

2. Description of the Prior Art

The highly viscous compounds proposed for preventing water migration usually are paraffin-like substances, petroleum waxes, petroleum jelly and the like. These substances are melted or heated until their viscosity is low and thereafter are pressed into the interstices between the conductors and into the space between the core and the sheath. After solidification the compounds introduced into the cable form a seal against water. A disadvantage of these substances is, however, that they become liquid again when the cable temperature rises. This may occur, for example, when such a cable wound on a drum is exposed to the sun for a long time. By the action of gravity the molten sealing compound then flows to the lower parts of the cable on the drum, causing poorly filled interstices or voids to be left in the remaining parts of the cable. This is particularly detrimental when the sealing compound has been applied in blocks. Another disadvantage is that the quality of conductor insulations of polyethylene when brought into contact with some paraffin-like substances deteriorates in electrical and mechanical respects in the long run.

When the interstices between the conductors and the space between the core and the sheath are filled with a foamed synthetic material, difficulties of another nature arise. Foaming is a process which is not readily controllable and which usually starts immediately after the foam-forming mixture has left its container. Foam-forming may have stopped before the interstices between the conductors and the space between the core and the sheath have sufficiently been filled. Another disadvantage is that as a rule a cable in which the core contains a foamed synthetic material as a sealing means will be stiff, which may cause difficulties when the cable is wound on a drum and is laid in the ground.

In the manufacture of power cables having a small number of conductors of circular cross-section it is known to fill the interstices between, and the space around, the conductors to a circular cross-section with a silicone rubber which is spontaneously vulcanized at room temperature. The vulcanizing agent is added to the filler material immediately before the application thereof.

A disadvantage of this method is that when the manufacturing process comes to a standstill conduits containing the material are likely to become clogged.

For this reason the use of such a spontaneously vulcanized filler material in manufacturing telecommunication cables, in particular when the material is applied in blocks and is intended to prevent penetration of water, gives rise to difficulties.

SUMMARY OF THE INVENTION

It is an object of the present invention to provide a method of manufacturing a permanently flexible longitudinally watertight cable in which the sealing compound does not flow upon heating and does not attack the conductor insulation.

According to the invention this is achieved by a method in which a silicone rubber which is vulcanized by the action of the moisture in the air is introduced into the interstices between the conductors and around the core, whereupon a sheath is provided around the core.

A silicone rubber which is vulcanized by the action of the moisture in the air is distinguished from a silicone rubber which vulcanizes at ambient temperature in that in the former vulcanization starts only when the rubber is exposed to a moisture-containing atmosphere, whereas in the latter vulcanization starts immediately when the constituents are mixed and is not influenced by the ambient atmosphere.

DESCRIPTION OF THE PREFERRED EMBODIMENT

Silicone rubbers which vulcanize at ambient temperature by the action of the air moisture are known and commercially available. They usually consist of a mixture of a diorganopolysiloxane, a filler such as silicon dioxide, a substance which causes crosslinking such, for example, as ethyl silicate, and a vulcanization catalyzer. Moisture curing compositions of this kind are described, for example, in U.S. Pat. No. 3,661,817. The commercial product may be used as such or mixed with a silicone oil or a rapidly evaporable solvent. The vulcanized compound is permanently rubber-elastic. It was found that for the purpose concerned the said silicone rubbers sufficiently adhere to the commonly used conductor insulations consisting, for example, of polyethylene and polyvinyl chloride, even if the cable is repeatedly bent, but can readily be removed by hand from the conductor insulation.

Another advantage of the silicone rubbers which vulcanize at ambient temperature by the action of the air moisture is that the process of vulcanization is comparatively slow. Hence the cable core can be provided with a sheath consisting of an overlappingly wound foil before termination of the vulcanizing process, which results in thorough filling of all the interstices between the conductors and of the space between the core and this sheath. During the process of encasing the cable core in the sheath the compound which has not yet been completely vulcanized and is still plastic is pressed into all the spaces between the cable core and the sheath. Under normal conditions the moisture of the air enclosed in the core after the provision of the sheath is sufficient in the vulcanizing process to produce complete vulcanization of the silicone rubber.

When the silicone rubber is applied in blocks it is possible to build up the blocks from layers. In the case of a core composed of a multiplicity of conductors twisted together, for example in the form of star-quads or pairs, layering may be effected in that when a layer of conductors or bundles of conductors is applied around the preceding layer, at the same time a layer is provided of the silicone rubber which vulcanizes at ambient temperature by the action of the air moisture. After vulcanization the amounts of silicone rubber provided successively at the same location but at a later instant form a single coherent barrier impenetrable to water. The same applies when the core is built up by twisting together conductor bundles. In this building-up process, during the formation of the cable core the unvulcanized silicone rubber is applied in and around the bundles at locations such that after assembly of the bundles the amounts of silicone rubber will form a single mass in the core at each block location.

Telecommunication cables manufactured by the method according to the invention are permanently flexible and provide no difficulty when being wound on drums or being installed. It was found that during installation the silicone rubber can simply be removed by hand from the conductors.

EXAMPLE

The core of a telephone cable comprising 150 star-quads of conductors which each consist of a copper wire of diameter 0,5 mm coated with an insulating layer of polyethylene 0.32 mm thick was built up by winding on an initial core consisting of 3 star-quads layers of successively 9, 15, 21, 27, 34 and 41 star-quads alternately in left and right helices.

Around each layer, except the outermost one, a foil of a linear polyester is wound in an open helix.

On the initial core and on each successive layer of star-quads silicone rubber which vulcanizes at ambient temperature by the action of the air moisture was provided at regular intervals (of 1 meter) through a length of about 10 cm in an amount such that the interstices between the conductors were completely filled. A material used for this purpose was a product which is marketed under the trade name Silastic 738 RTV by Dow Corning Corporation and which according to the manufacturer is a silicone rubber which vulcanizes at room temperature by the action of the air moisture.

A foil consisting of a linear polyester was overlappingly wound around the cable core and subsequently a sheath was extruded onto the core.

To determine the effect of the sealing, a length of the resulting cable laid horizontally was connected to a vertically arranged tube which contained water to a height of 1 m above the cable. After 6 weeks it was found that the water had penetrated only to the first barrier of silicone rubber.

What is claimed is:

1. A method of manufacturing a longitudinally watertight telecommunication cable, which comprises providing an initial multiplicity of longitudinally extending synthetic resin-insulated conductors, applying about said initial multiplicity of conductors in longitudinally separated regions first layers of a moisture-vulcanizable silicone rubber, positioning a second multiplicity of longitudinally extending synthetic resin-insulated conductors about said first conductor-silicone rubber combination, applying about said second multiplicity of conductors second layers of a moisture-vulcanizable silicone rubber at the same longitudinally separated regions as the first layers of moisture-vulcanizable silicone rubber, repeating said sequential steps of positioning a multiplicity of longitudinally extending synthetic resin-insulated conductors and applying layers of a moisture-vulcanizable silicone rubber until a cable core having the desired diameter is obtained, and thereafter applying a sheath about said cable core before the silicone rubber has been completely vulcanized.

2. A method according to claim 1, which includes winding a foil of a linear polyester about at least one of said conductor-silicone rubber combinations in an open helix prior to positioning a next multiplicity of said conductors about said combination.

* * * * *